United States Patent [19]

Hashimoto et al.

[11] 4,170,276
[45] Oct. 9, 1979

[54] MOTOR WITH SELECTABLE SPEED CLUTCH

[75] Inventors: Yoshihiro Hashimoto; Shigeaki Oyama, both of Hachioji; Hiroshi Araki, Fussa, all of Japan

[73] Assignee: Fujitsu Fanuc Limited, Japan

[21] Appl. No.: 762,131

[22] Filed: Jan. 24, 1977

[30] Foreign Application Priority Data

Jan. 23, 1976 [JP] Japan .................................... 51-5825

[51] Int. Cl.² .............................................. F16D 27/12
[52] U.S. Cl. .............................. 192/48.91; 192/84 AA
[58] Field of Search ............... 192/48.2, 84 A, 84 AA, 192/84 AB, 84 B, 84 R, 48.91

[56] References Cited

U.S. PATENT DOCUMENTS

| | | | |
|---|---|---|---|
| 1,132,478 | 3/1915 | Johnson | 192/84 AA |
| 2,267,114 | 12/1941 | Lear et al. | 192/84 R |
| 2,331,699 | 10/1943 | Kirby | 192/48.91 |
| 2,692,667 | 10/1954 | Bliedung et al. | 192/84 R |
| 2,762,229 | 9/1956 | Coning et al. | 192/84 AA |
| 2,851,865 | 9/1958 | Jacobs | 192/84 AB |
| 2,862,590 | 12/1958 | Schuman | 192/84 A |
| 3,062,346 | 11/1962 | Sharpe | 192/48.91 |
| 3,203,279 | 8/1965 | Rahrig et al. | 192/84 AA |
| 3,921,770 | 11/1975 | Daab et al. | 192/84 R |

*Primary Examiner*—Neil Abrams
*Attorney, Agent, or Firm*—Staas & Halsey

[57] ABSTRACT

A motor having a clutch device which can provide a desired one of two (or more) rotating speeds of a rotor of the motor, comprising: an armature which is rotated by a driving shaft of said rotor and is slidable along the axis thereof; two rotating drive members which are rotatably supported by said driving shaft; electromagnetic exciting members which can attract said armature to a desired one of said rotating drive members, wherein a desired one of said rotating drive members produces rotational power due to the rotation of said driving shaft via said armature.

4 Claims, 6 Drawing Figures

MOTOR WITH SELECTABLE SPEED CLUTCH

The present invention relates to a motor, and more particularly to a motor having a clutch device, which clutch device can provide one of two or more selective rotating speeds from having a constant rotating speed.

To obtain one of two or more selective rotating speeds from the motor's constant rotating speed, a clutch device has usually been utilized in the prior art. The clutch device should generally be simple in construction, operate with certainty in accordance with a command, and, further, be easy to handle during repair or inspection. However, a conventional clutch device is complicated in construction, does not operate with certainty in accordance with a command, and, further, is difficult to handle during repair or inspection.

Therefore, it is an object of the present invention to provide a motor having a clutch device, which clutch device provides one of two or more selectable rotating speeds from the constant rotating speed of the motor, which motor having a clutch device is simple in construction, operates with certainty in accordance with a command, and, further, is easy to handle during repair or inspection.

The present invention will be more apparent from the ensuing description with reference to the accompanying drawings wherein.

Figure 1:
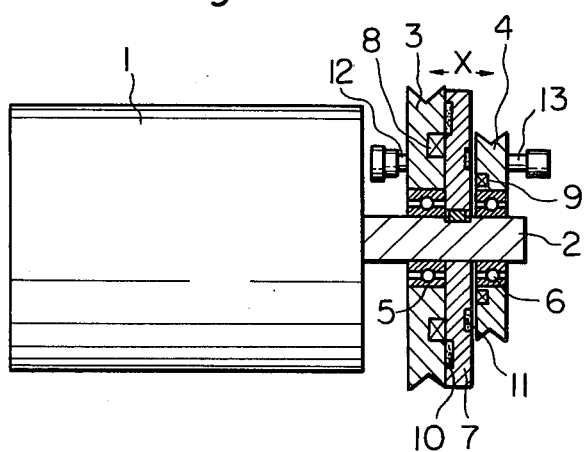
FIG. 1 is an elevation view, partly in section, showing a first embodiment of a motor having a clutch device according to the present invention.

FIG. 1, which is an elevation view, partly in section, showing a first embodiment of a motor having a clutch device according to the present invention. Numeral 1 indicates a motor and 2 indicates a driving shaft of a rotor (not shown) which is located inside the motor 1. The driving shaft 2 of the motor 1 has a clutch device comprised of a first pulley 3, a second pulley 4, an armature 7 and other members shown in FIG. 1. The first pulley 3 is rotatably supported by the driving shaft 2 by means of a bearing assembly 5. The second pulley 4 is also rotatably supported by the driving shaft 2 by means of a bearing assembly 6. The diameter of the second pulley 4 is smaller than that of the first pulley 3. The armature 7 is fixedly supported by the driving shaft 2 and is rotated by the driving shaft 2. However, the armature 7 is freely slidable with respect to the driving shaft 2, but only in a direction along the axis of the driving shaft 2, that is, in the directions of the arrows X.

The first pulley 3 is provided with a first exciting coil 8 in one side thereof, and the first exciting coil 8 faces one side of the armature 7. The second pulley 4 is also provided with a second exciting coil 9 in one side thereof, and the second exciting coil 9 faces the other side of the armature 7. The armature 7 is provided with a first friction disc 10 facing one side of the first pulley 3 and a second friction disc 11 facing one side of the second pulley 4.

The numerals 12 and 13 indicate a first brush and a second brush, respectively. The electric power for energizing the first exciting coil 8 is supplied through the first brush 12. The electric power for energizing the second exciting coil 9 is supplied through the second brush 13. The first brush 12 is fixedly supported by a holder (not shown) and is able to be slipped on a trolley line (not shown) which is arranged on one side of the first pulley 3. The trolley line is electrically connected to one end of the first exciting coil 8. The other end of the first exciting coil 8 is grounded. The second brush 13 is also fixedly supported by a holder (not shown) and is able to be slipped on a trolley line (not shown) which is arranged on one side of the second pulley 4. The trolley line on the second pulley 4 is electrically connected to one end of the second exciting coil 9. The other end of the second exciting coil 9 is grounded. When electric power is supplied to the first exciting coil 8 through the first brush 12, the first exciting coil 8 is accordingly energized, thereby causing the armature 7 to be electromagnetically attracted to the first pulley 3. Accordingly, the armature 7 is moved toward the left side in FIG. 1 and is pressed against the side of the first pulley 3 as shown in FIG. 1. Then the rotational power of the armature 7 is transmitted to the first pulley 3 through the friction disc 10, and first pulley 3 is rotated. Thus, the motor 1 provides a first rotating speed via the first pulley 3. Contrary to the above, when electric power is supplied to the second exciting coil 9 through the second brush 13, the second exciting coil 9 is energized, thereby causing the armature 7 to be electromagnetically attracted to the second pulley 4. Accordingly, the armature 7 is moved toward the right side in FIG. 1 and is pressed against the side of the second pulley 4. The rotational power of the armature 7 is then transmitted to the second pulley 4 through the second friction disc 11 and causes second pulley 4 to rotate. Thus, the motor 1 provides a second rotating speed via the second pulley 4.

Figure 2:
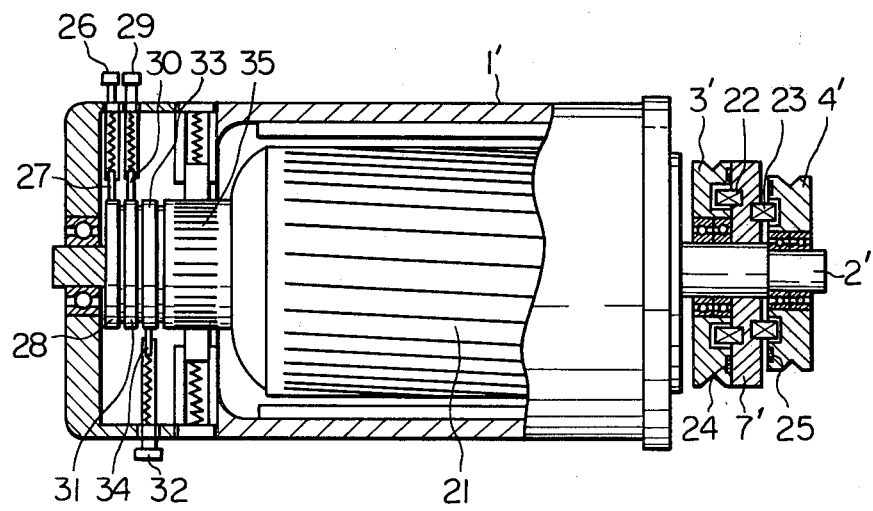
FIG. 2 is an elevation view, partly cut away and partly in section, showing a second embodiment of a motor having a clutch device according to the present invention.

In FIG. 2, which is an elevation view, partly cut away and partly in section, showing a second embodiment of a motor having a clutch device according to the present invention, 1' indicates the electric motor and 2' indicates a driving shaft of a rotor 21. The clutch device is comprised of a first pulley 3', a second pulley 4', an armature 7' and other members shown in FIG. 2. The first pulley 3' and second pulley 4' are rotatably supported by the driving shaft 2'. The armature 7' is fixedly supported by the driving shaft 2' and is rotated thereby; however, the armature 7' is freely slidable with respect to the driving shaft 2'. The armature 7' is provided with both a first exciting coil 22 and a second exciting coil 23. The first exciting coil 22 faces the first pulley 3', and the second exciting coil 23 faces the second pulley 4'. The first pulley 3' is provided with a first friction disc 24, and the second pulley 4' is provided with a second friction disc 25. The operation of the clutch device is basically the same as mentioned hereinbefore. When the first exciting coil 22 is energized, the rotational power of the armature 7' is transmitted to the first pulley 3' by means of the first friction disc 24. If the second exciting coil 23 is energized, the rotational power of the armature 7' is transmitted to the second pulley 4' by means of the second friction disc 25.

When a first rotating speed is required via the first pulley 3', electric power is supplied from a first terminal 26 to one end of the first exciting coil 22 through a first brush 27, a first slip ring 28 and a first conductor (not shown). The first conductor extends inside the driving shaft 2' along the axis of the shaft 2'. When a second rotating speed is required by way of the second pulley 4', electric power is supplied from a second terminal 29 to one end of the second exciting coil 23 through a second brush 30, a second slip ring 31 and a second conductor (not shown). The second conductor extends inside the driving shaft 2' along the axis of the shaft 2'. The other end of the first exciting coil 22 and the other end of the second exciting coil 23 are led to a common earth terminal 32 through a common conductor (not shown), a common slip ring 33 and a common brush 34. The common conductor extends inside the driving shaft 2' along the axis of the shaft 2'. Accordingly, the first, second and common conductors are located inside the driving shaft 2' and are rotated together with the driving shaft 2'. The first slip ring 28, the second slip ring 31 and the common slip ring 33 are rigidly connected to the driving shaft 2' and are arranged in parallel with a commutator 35 of the rotor 21.

Figure 3:
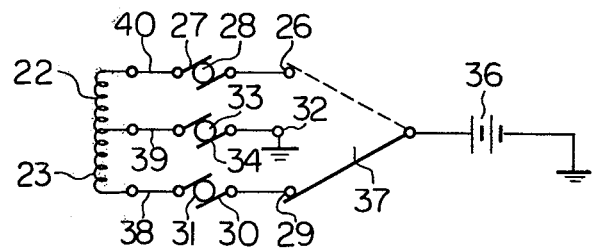
FIG. 3 is an equivalent circuit diagram of an energizing means of a clutch device shown in FIG. 2.

FIG. 3 is an equivalent circuit diagram of the energizing means of the clutch device shown in FIG. 2. In FIG. 3, electric power is provided from an electric source 36 and is selectively supplied to the first terminal 26 or the second terminal 29 by means of a switch 37. When the switch 37 cooperates with the second terminal 29, electric current flows from the second terminal 29 to the common earth terminal 32 through the second brush 30, the second slip ring 31, the aforesaid second conductor 38, the second exciting coil 23, the aforesaid common conductor 39, the common slip ring 33 and the common brush 34, whereby the second exciting coil 23 is energized. The same operation as mentioned above is performed with regard to the first exciting coil 22 when the switch 37 cooperates with the first terminal 26. The aforesaid first conductor is referenced by the numeral 40.

In the above-mentioned first and second embodiments, two kinds of rotating speeds are obtained due to the constant rotating speed of the rotor of the motor via the first pulley and the second pulley. However, it should be noted that three or more rotating speeds can be obtained by the adding a further pulley and another armature to the driving shaft.

Figure 4:
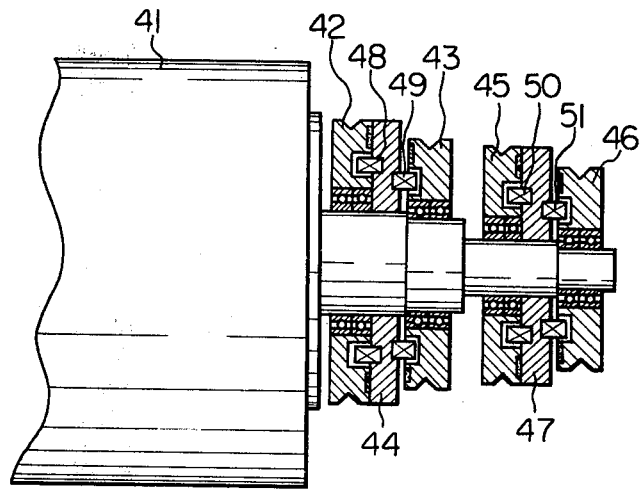
FIG. 4 is an elevation view, partly cut off and partly in section, showing a third embodiment of a motor having a clutch device according to the present invention.

FIG. 4 is an elevation view, partly cut off and partly in section, showing a third embodiment according to the present invention. In the third embodiment, one of four rotating speeds is obtained from the motor 41. If necessary, two of four rotating speeds can be obtained at the same time from the motor 41. In FIG. 4, a first pulley 42 and a second pulley 43 selectively cooperate with an armature 44, and a third pulley 45 and a fourth pulley 46 selectively cooperate with an armature 47. The first, second, third and fourth exciting coils are referenced by the numerals 48, 49, 50 and 51, respectively.

Figure 5:
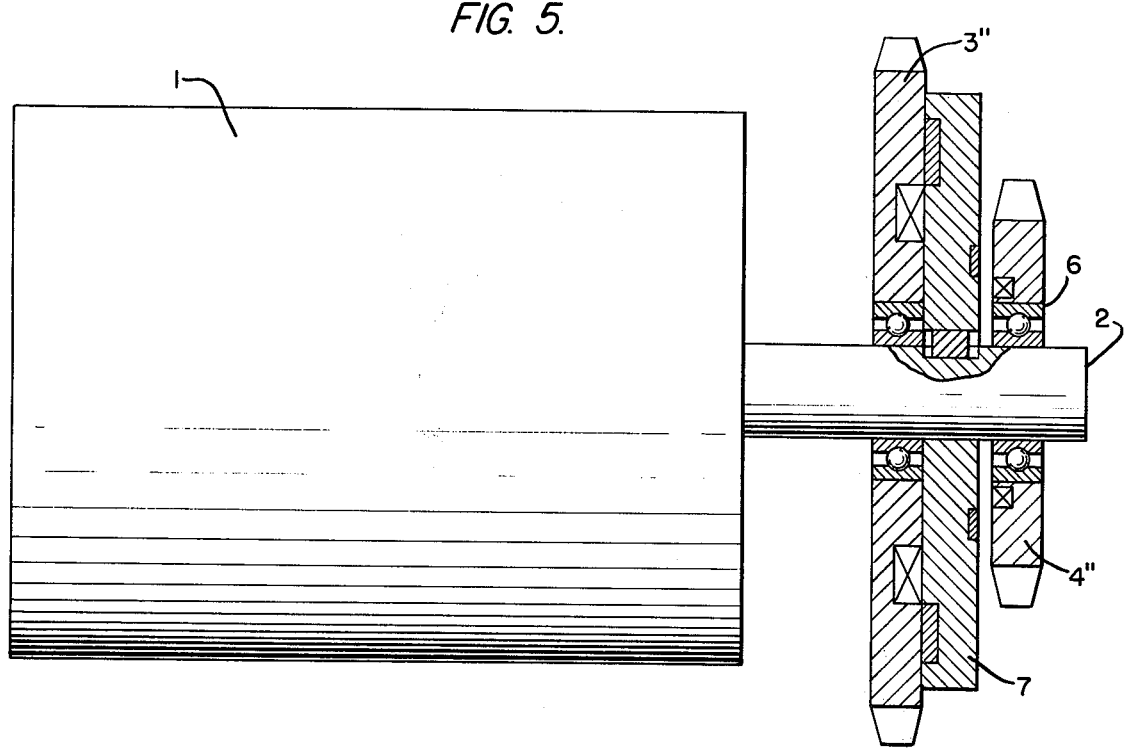
FIG. 5 is an elevation view, partly in section, showing spockets rather than pulleys used as rotating drive members.
Figure 6:
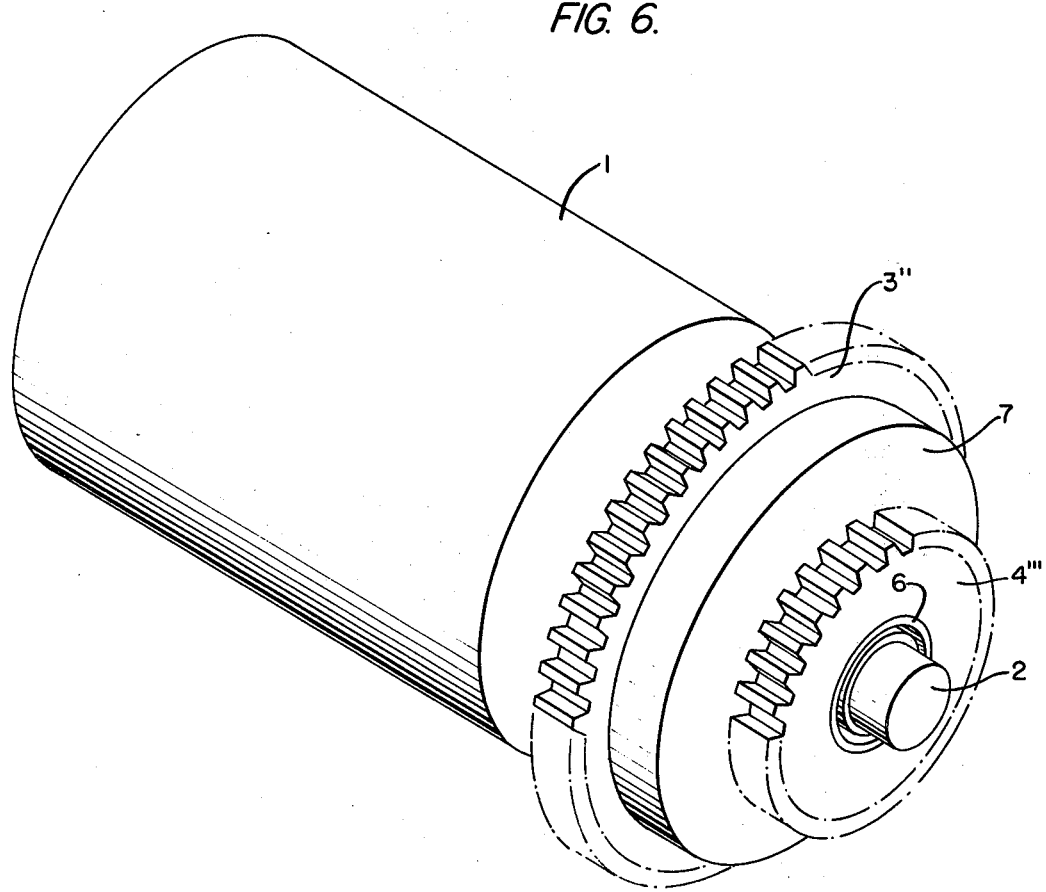
FIG. 6 is a perspective view showing gears rather than pulleys used as rotating drive members.

In the first, second and third embodiments, it should be noted that the rotating drive members can be comprised of not only pulleys (3, 3', 4, 4', 42, 43, 45 and 46) but also sprockets or gears. For example, in FIG. 5, first sprocket wheel 3" is used instead of first pulley 3 in FIG. 1, and second sprocket wheel 4" is used in lieu of second pulley 4. Similarly, in FIG. 6, first gear 3''' and second gear 4''' are used in lieu of pulleys 2 and 4. Further power transmitting members can be comprised of not only friction discs (10, 11, 24 and 25) but also gears or pairs of notches and detents.

As mentioned above, a motor having a clutch device according to the present invention can provide one of two or more rotating speeds from the constant rotating speed of the motor by selectively energizing a desired one of the exciting coils. Furthermore, the motor having the clutch device according to the present invention is simple in construction, operates with certainty in accordance with a command, and, further, is easy to repair or inspect.

What is claimed is:
1. A motor having a clutch device, comprising:
a motor having a driving shaft;
an armature having both a first contact surface and a second contact surface, said armature being fixedly supported by said driving shaft of said motor and being rotated by said driving shaft, but being slidable with respect to said driving shaft along the axis thereof;
a first rotating drive member having a contact surface corresponding to said first contact surface of said armature, said first rotating drive member being rotatably supported by said driving shaft and facing toward said first contact surface of said armature;
a second rotating drive member having a contact surface corresponding to said second contact surface of said armature, said second rotating drive member being rotatably supported by said driving shaft and facing toward said second contact surface of said armature;
a first electromagnetic exciting member which attracts said armature toward said first rotating drive member when said first electromagnetic exciting member is energized and, thereby, said first contact surface of said armature is directly connected to the contact surface of said first rotating member;
a second electromagnetic exciting member which attracts said armature toward said second rotating drive member when said second electromagnetic exciting member is energized and, thereby, said second contact surface of said armature is directly connected to the contact surface of said second rotating member;
an energizing member which energizes said first electromagnetic exciting member and said second electromagnetic exciting member, alternately, wherein said energizing member is comprised of a first brush and a first slip ring which is rigidly supported by said driving shaft and is electrically connected to said first electromagnetic exciting member via the driving shaft, the first brush being slipped on the first slip ring for supplying electric power;
a first power transmitting member which transmits the rotation of said armature to said first drive member when said first electromagnetic exciting member is energized; and
a second power transmitting member which transmits the rotation of said armature to said second drive member when said first electromagnetic exciting member is energized.

2. A motor having a clutch device as set forth in claim 1, wherein said energizing member is comprised of a second brush and a second slip ring which is rigidly supported by said driving shaft and is electrically connected to said second electromagnetic exciting member by way of the driving shaft, in which the second brush is slipped on the second slip ring for supplying electric power.

3. A motor having a hollow shaft, wherein the improvement comprises:
- at least one first drive member rotatably mounted on said shaft;
- at least one second drive member, each of said at least one second drive members corresponding to one of said at least one first drive members and being rotatably mounted on said shaft at a spaced-apart position from said corresponding one of said at least one first drive members;
- at least one armature corresponding to each of said at least one first and second drive members, each of said at least one armatures being mounted on said shaft between said corresponding at least one first and second drive members, being fixed to said shaft with respect to rotation, and being movable along the axis of said shaft;
- at least one first means for pressing each of said at least one armatures to said corresponding one of said at least one first drive members; wherein said at least one first means comprises electromagnets mounted on said corresponding at least one first drive members;
- at least one second means for pressing each of said at least one armatures to said corresponding one of said at least one second drive members, wherein said at least one second means comprises electromagnets mounted on said corresponding at least one second drive members; and wires extending through said hollow shaft to said electromagnets.

4. A motor having a hollow shaft, wherein the improvement comprises:
- at least one first drive member rotatably mounted on said shaft;
- at least one second drive member, each of said at least one second drive members corresponding to one of said at least one first drive members and being rotatably mounted on said shaft at a spaced-apart position from said corresponding one of said at least one first drive members;
- at least one armature corresponding to each of said at least one first and second drive members, each of said at least one armatures being mounted on said shaft between said corresponding at least one first and second drive members, being fixed to said shaft with respect to rotation, and being movable along the axis of said shaft;
- at least one first means for pressing each of said at least one armatures to said corresponding one of said at least one first drive members, wherein said at least one first means comprises electromagnets mounted on said at least one armatures and facing said corresponding at least one first drive members;
- at least one second means for pressing each of said at least one armatures to said corresponding one of said at least one second drive members, wherein said at least one second means comprises electromagnets mounted on said at least one armatures and facing said corresponding at least one second drive members; and
- wires extending through said hollow shaft to said electromagnets.

* * * * *

UNITED STATES PATENT AND TRADEMARK OFFICE
CERTIFICATE OF CORRECTION

PATENT NO. : 4,170,276
DATED : October 9, 1979
INVENTOR(S) : Yoshihiro Hashimoto et al.

It is certified that error appears in the above-identified patent and that said Letters Patent are hereby corrected as shown below:

* Col. 1, line 43, "spockets" should be --sprockets--.

Signed and Sealed this

Twenty-second Day of January 1980

[SEAL]

Attest:

SIDNEY A. DIAMOND

Attesting Officer

Commissioner of Patents and Trademarks